US009041741B2

(12) United States Patent
Mabbutt et al.

(10) Patent No.: US 9,041,741 B2
(45) Date of Patent: May 26, 2015

(54) USER INTERFACE FOR A HEAD MOUNTED DISPLAY

(71) Applicant: QUALCOMM Incorporated, San Diego, CA (US)

(72) Inventors: Paul Mabbutt, Peterborough (GB); Giuliano Maciocci, Cambridge (GB); Louise M. Auger, Cambridge (GB)

(73) Assignee: Qualcomm Incorporated, San Diego, CA (US)

( * ) Notice: Subject to any disclaimer, the term of this patent is extended or adjusted under 35 U.S.C. 154(b) by 78 days.

(21) Appl. No.: 13/827,339

(22) Filed: Mar. 14, 2013

(65) Prior Publication Data
US 2014/0267400 A1  Sep. 18, 2014

(51) Int. Cl.
G09G 5/00 (2006.01)
G06T 19/00 (2011.01)
G02B 27/00 (2006.01)
G06F 3/01 (2006.01)
G02B 27/01 (2006.01)
G06F 1/16 (2006.01)
G01C 21/36 (2006.01)

(52) U.S. Cl.
CPC ............... G06T 19/006 (2013.01); G06F 3/011 (2013.01); G02B 2027/014 (2013.01); G02B 2027/0123 (2013.01); G06F 1/163 (2013.01); G02B 2027/0138 (2013.01); G06F 3/017 (2013.01); G01C 21/3664 (2013.01); G06F 3/012 (2013.01); G02B 27/017 (2013.01); G02B 2027/0178 (2013.01); G02B 27/0093 (2013.01); G01C 21/365 (2013.01)

(58) Field of Classification Search
CPC ................. G02B 2027/014; G02B 2027/0178; G02B 27/017; G02B 2027/0123; G02B 2027/0138; G06F 1/163; G06F 3/011; G06F 3/017
USPC .............................. 345/8, 156, 158, 633–634
See application file for complete search history.

(56) References Cited

U.S. PATENT DOCUMENTS

| | | | |
|---|---|---|---|
| 6,198,462 B1 | 3/2001 | Daily et al. | |
| 2006/0197832 A1 | 9/2006 | Yamada et al. | |
| 2008/0106489 A1 | 5/2008 | Brown et al. | |
| 2009/0005961 A1 | 1/2009 | Grabowski et al. | |
| 2010/0238161 A1 | 9/2010 | Varga et al. | |
| 2011/0018903 A1 | 1/2011 | Lapstun et al. | |
| 2012/0075167 A1 | 3/2012 | Lahcanski et al. | |
| 2012/0212400 A1* | 8/2012 | Border et al. | 345/8 |
| 2012/0242560 A1 | 9/2012 | Nakada et al. | |
| 2012/0287284 A1 | 11/2012 | Jacobsen et al. | |
| 2013/0007672 A1 | 1/2013 | Taubman | |
| 2013/0127980 A1* | 5/2013 | Haddick et al. | 348/14.08 |
| 2013/0135353 A1* | 5/2013 | Wheeler et al. | 345/660 |
| 2013/0139082 A1* | 5/2013 | Wheeler et al. | 715/765 |
| 2013/0222638 A1* | 8/2013 | Wheeler et al. | 348/231.2 |
| 2013/0278631 A1* | 10/2013 | Border et al. | 345/633 |
| 2013/0335301 A1* | 12/2013 | Wong et al. | 345/8 |

OTHER PUBLICATIONS

International Search Report and Written Opinion—PCT/US2014/018938—ISA/EPO—May 12, 2014.

* cited by examiner

Primary Examiner — Jin-Cheng Wang
(74) Attorney, Agent, or Firm — Kilpatrick Townsend & Stockton LLP

(57) ABSTRACT

A user interface (UI) of a head mounted display (HMD) is provided that allows a user to access one or more persistent data elements that are otherwise outside the user's initial field of view by using a head movement, such as a head tilt (i.e., movement about a horizontal axis) and/or rotation (i.e., movement about a vertical axis). Embodiments also can provide for further movement and/or other manipulation of data of persistent data elements with further detected movement of the user's head.

27 Claims, 10 Drawing Sheets

USER INTERFACE FOR A HEAD MOUNTED DISPLAY

BACKGROUND OF THE INVENTION

A see-through head mounted display (HMD) is a wearable device with which a user can see data elements on a display while keeping view of the user's surroundings. This feature of a see-through HMD can be useful in navigational contexts, where the HMD provides a user navigational data while the user is moving along a navigation route.

SUMMARY

Embodiments of the invention described herein provide for a user interface (UI) of an HMD that allows a user to access one or more persistent data elements that are otherwise outside the user's initial field of view by using a head movement, such as a head tilt (i.e., movement about a horizontal axis) and/or rotation (i.e., movement about a vertical axis). Embodiments also can provide for further movement and/or other manipulation of data of persistent data elements with further detected movement of the user.

An example method for displaying data by a see-through HMD, according to the disclosure, includes determining a first field of view of a user of the HMD, receiving sensor input from at least one sensor, and detecting, using the sensor input, a first movement of the user's head about an axis, causing the user to have a second field of view. The method further includes causing the HMD to display one or more persistent data elements in the second field of view, based on the detected first movement.

An example apparatus, according to the disclosure, comprises a memory and a processing unit communicatively coupled with the memory one or more motion sensors configured to sense movement of a user of a see-through HMD, and a display of the HMD. The display is configured to show data elements in a user's field of view while allowing the user to view physical objects in the user's environment. The processing unit is configured to determine a first field of view of the user of the HMD, receive sensor input from the one or more motion sensors, and detect, using the sensor input, a first movement of the user's head about an axis, causing the user to have a second field of view. The processing unit is further configured to cause the display to show one or more persistent data elements in the second field of view, based on the detected first movement.

An example computer-readable storage medium, according to the disclosure, has instructions embedded thereon for displaying data elements on a see-through HMD. The instructions include computer-executable code for determining a first field of view of a user of the HMD, receiving sensor input from at least one sensor, and detecting, using the sensor input, a first movement of the user's head about an axis, causing the user to have a second field of view. The instructions also include computer-executable code for displaying, with the HMD, one or more persistent data elements in the second field of view, based on the detected first movement.

An example apparatus, according to the disclosure, includes means for determining a first field of view of a user of the HMD, means for receiving sensor input from at least one sensor, and means for detecting, using the sensor input, a first movement of the user's head about an axis, causing the user to have a second field of view. The apparatus further includes means for displaying, via the HMD, one or more persistent data elements in the second field of view, based on the detected first movement.

An example method, according to the description, includes detecting a movement of a head of a user wearing a head mounted display (HMD) having display elements that are at least semi-transparent, and in response to the detecting, causing one or more persistent data elements to be displayed on the head mounted display such that the elements are overlaid on a portion of a scene viewable by the user through the semi-transparent display elements.

The method may include one or more of the following features. The movement can include a nod or a head jerk, and the persistent data elements can appear to pop up or slide into a field of view of the user. Detecting movement of the head can include determining that the user has moved the head such that at least a portion of an expected field of view is no longer visible to the user, and the persistent data elements can be displayed in an area that is outside the expected field of view. The persistent data elements can appear to be anchored to objects outside the expected field of view. The expected field of view can be determined based on a direction of travel of the user. The direction of travel can be determined using a compass and/or plurality of positioning measurements. The persistent data elements can be hidden when the user is viewing the expected field of view. Detecting movement of the head can include determining that the user has moved the head such that at least a portion outside of an expected field of view is visible to the user, and the persistent data elements can be displayed in the portion outside of the expected field of view.

The method may include one or more of the following features in addition or as an alternative to the features above. The detected movement can include a downward tilt of the head, and the persistent data elements can be displayed on a virtual surface that is approximately parallel or coincident with a ground surface. The persistent data elements can include a map and/or navigation elements that appear to the user to be displayed on the ground surface. The map can appear to be fixed to the ground surface such that, when the head is turned, different portions of the map are displayed in the HMD. An indicator representative of a point of interest out of view of the user can be displayed at an edge of the map and/or at a horizon line in a direction in which the point of interest is located. The method can also include detecting a hand motion of the user and causing the map to zoom based on the detected hand motion.

The method may include one or more of the following features in addition or as an alternative to the features above. Detecting movement of the head can include detecting, with a gyroscope or an accelerometer, that the user has tilted the head up or down. Detecting movement of the head can further include comparing data from the gyroscope to elevation data to determine whether the head is tilted in a direction in which a path on which the user is located is tilted. The persistent data elements can include a clock, an appointment, a calendar, an alert, a received message or calls, or a social networking status or update or post. The method can further include detecting a hand gesture of the user and adjusting at least one of the elements based on the detected hand gesture. The hand gesture can be detected with an optical sensor, a microphone sensitive to ultrasonic frequencies, or a sensor for electromagnetic radiation. The method can further include determining a selection of one of the elements based on an eye gaze of the user and causing additional information to be displayed about the selected element.

Items and/or techniques described herein may provide one or more of the following capabilities, as well as other capabilities not mentioned. Techniques can provide for easy access to persistent data elements without crowding the user's normal field of view. Embodiments can also help ensure good contrast of displayed data elements with physical objects in the user's environment by displaying the data elements at or near the bottom of the field of view. These and other embodiments, along with many of its advantages and features, are described in more detail in conjunction with the text below and attached figures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Head-mounted displays (HMDs) are devices that can display information to a user wearing the device. Because these devices are worn on a user's head, HMDs can have capabilities that are unachievable in other displays. For example, certain HMDs may have a transparent (or semi-transparent) display enabling the user to view both the user's surroundings as well as images on the display. The images themselves may have a degree of transparency, which may be determined by an application executed by the HMD. Some embodiments can provide "augmented reality" (AR) functionality by overlaying physical objects viewed by a user with images (such as text and/or pictures) associated with the physical objects.

Figure 1:
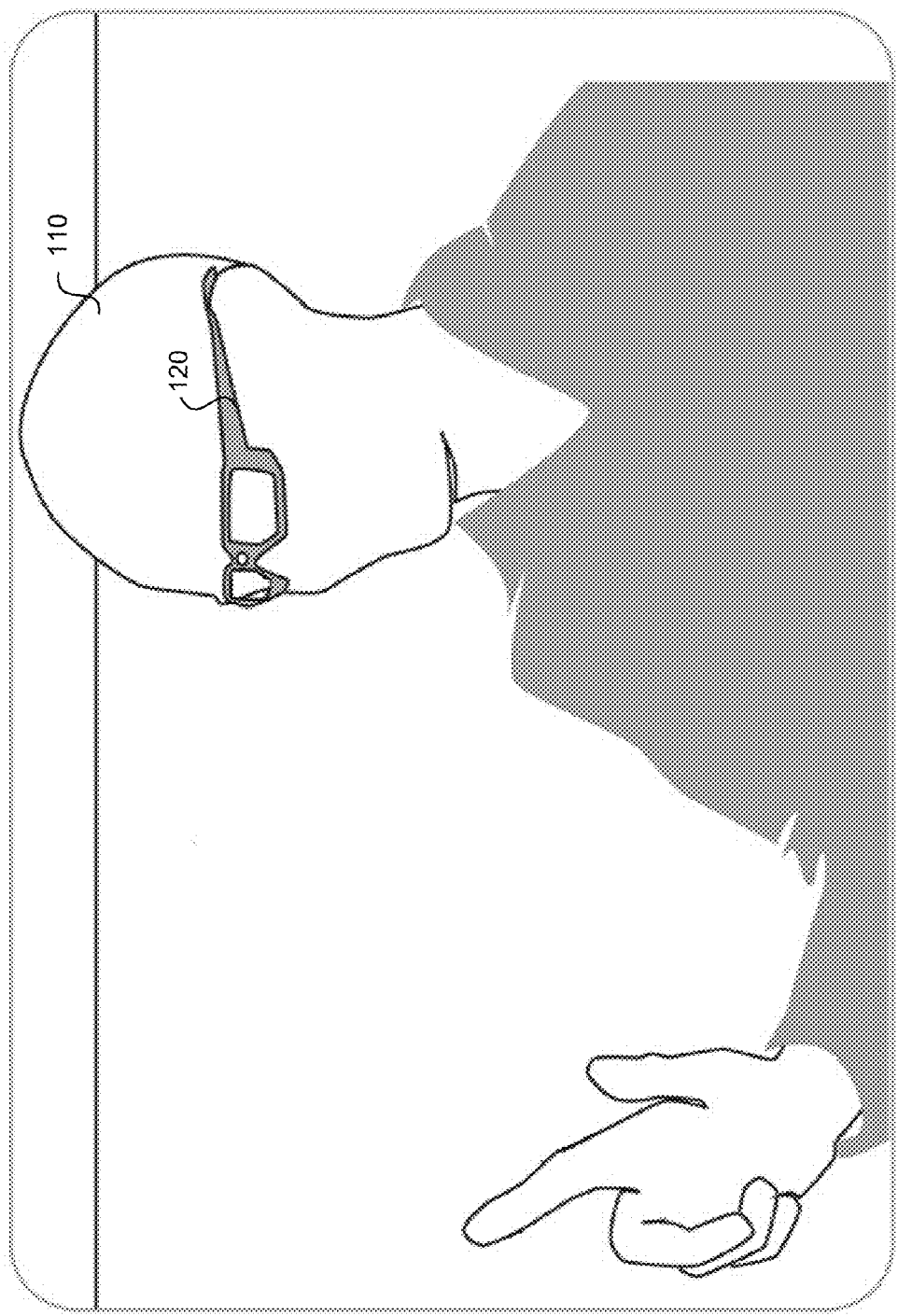
FIG. 1 is a simplified illustration of one embodiment of an HMD worn on the head of a user that can be used with one or more of the embodiments described herein.

FIG. 1 is a simplified illustration of one embodiment of an HMD 120 worn on the head of a user 110 that can be used with or can implement one or more of the embodiments described herein. This HMD 120 includes a body or frame, similar to a pair of glasses, which can rest on the nose and ears of a user. Portions of the display of the HMD 120 can be positioned in front of a user's eyes like lenses of a pair of glasses. At least a portion of the display can be transparent, such that within the user's field of view the user 110 can see both the user's surroundings and images (e.g., data elements) shown with the display. The level of transparency of the images shown on the display may vary, depending on the desired functionality of the display, settings of a graphical user interface (GUI) shown with the display, and/or a software application executed by the HMD 120 (e.g., a video, a map, an Internet browser, etc.). The HMD is preferably lightweight and constructed to avoid use of heavy components, which could cause the device to be uncomfortable to wear.

Furthermore, the HMD 120 may include interfaces such as speakers (and/or headphones), a touchpad, buttons, and the like to interact with the user 110. In another embodiment, the HMD 120 may include a wireless interface for connecting with the Internet, a local wireless network, or another computing device. The HMD 120 may also be operable to receive audio and/or gestural inputs from a user. Such gestural or audio inputs may be spoken voice commands or a recognized user gesture, which when recognized by a computing device may cause that device to execute a corresponding command. Gestures may be received from one or more motion sensors and/or cameras integrated into and/or communicatively coupled with the HMD 120 to allow the HMD to track one or more objects, such as a user's hand(s), and determine whether the object(s) has made a gesture. Furthermore, embodiments may include camera(s) and/or other sensors to determine the gaze of a user (e.g., where a user is looking). This eye-tracking functionality can be incorporated into gestures and/or other user inputs.

Furthermore, the HMD 120 can include and/or be communicatively coupled with motion sensors, such as one or more accelerometer(s), magnetometer(s), gyroscopes, Global Positioning System (GPS) receiver(s) (and/or other Satellite Positioning System (SPS) receiver(s)), altimeter(s), and the like, to sense the movement and/or orientation of the user 110 and/or the user's head. A determination of the user's field of view, for purposes of displaying elements as described herein, can be based on sensor information providing, for example, a detected head orientation/direction of travel of the user. A direction of travel can be determined by, for example, a compass (e.g., a magnetometer) and/or a plurality of positioning measurements (e.g., SPS location measurements). Elevation and/or context data may be used to determine whether a user is looking down or up because a pathway is slanted. For instance, data from the gyroscope may be compared to elevation data to determine whether the head is tilted in a direction in which a path on which the user is located is tilted. The determination of the user's field of view described in more detail below. Similarly, a context of the user may be determined to ascertain whether the user is tilting his head, for example, because he is ascended a set of stairs or on an escalator.

Figure 7:
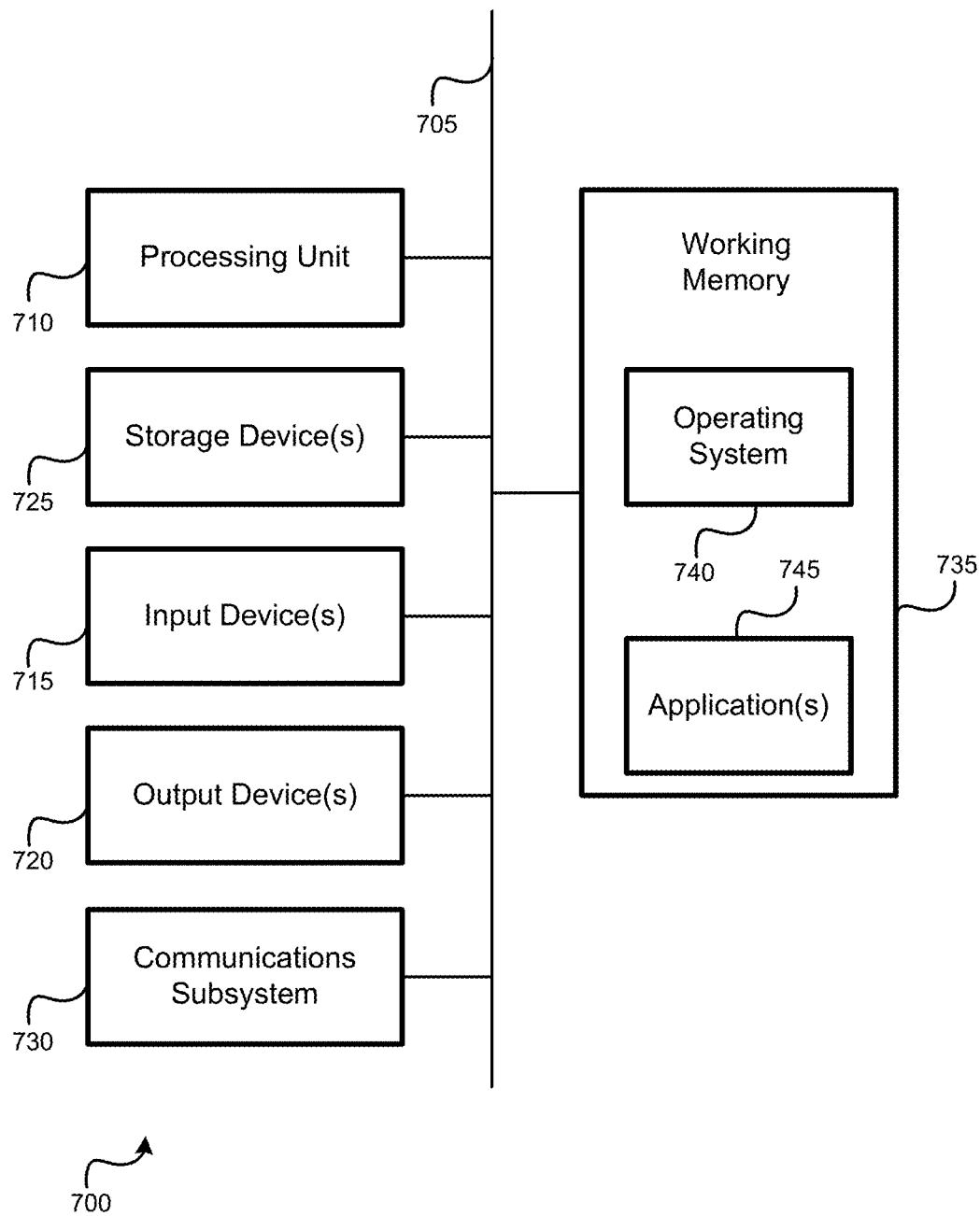
FIG. 7 illustrates an embodiment of a computer system.

A computer system, such as computer system 700 of FIG. 7 may be integrated into and/or communicatively coupled with the HMD 120. Accordingly, the HMD 120 can execute software applications such as the navigational application and/or other applications described herein. Additionally or alternatively, embodiments of the HMD 120 can display software applications executed by one or more devices communicatively coupled with the HMD 120 via, for example, wireless device-to-device protocol (e.g., BLUETOOTH or WI-FI DIRECT) and/or via a network (e.g., a WIFI network). For instance, the HMD 120 may be communicatively coupled with one or more mobile devices such as a mobile phone, personal media player, game system, and/or other device, and display information from the mobile device.

The HMD 120 may also be configured to communicate wirelessly with a network, which may include one or more private and/or public networks. A private network may include a corporate intranet; a public network may include the Internet, for example. By using a network, the HMD 120 may be able to communicate with a remote server, which may be used to perform services remote from the HMD 120. For a navigational application, such services can include navigation information retrieval, route calculation, and the like. A remote server may provide other services for other types of applications.

Although FIG. 1 shows an embodiment of an HMD 120 with a glasses-like frame, other embodiments can have different form factors and/or utilize different optical technologies (e.g., a retinal projector or other optical system) that can offer similar functionality. The ability to allow a user to see objects in the user's environment as well as images shown on the HMD 120 can be useful navigational applications in which the HMD 120 provides a user navigational data while the user is moving along a navigation route.

Current HMD implementations typically take the approach of displaying data elements such as estimated time or arrival, turning directions, a map, or other data, constantly within the user's field of view, no matter which way a user may be looking. This approach can be problematic not only because the data elements (particularly in the upper part of the user's field of view) can be difficult to see in bright ambient light due to HMD technologies, but also because it can be distracting and obstructive.

Figure 2A:
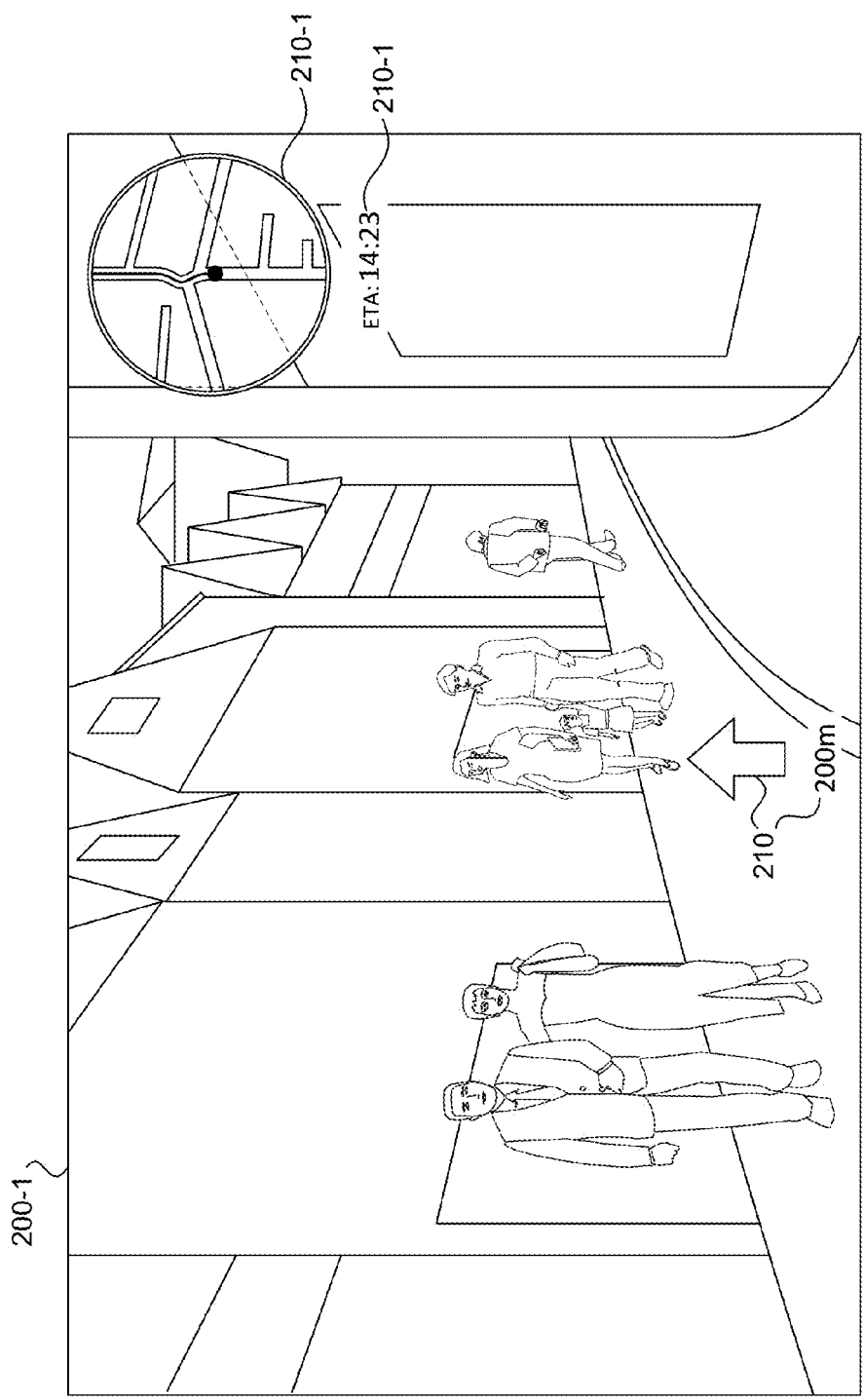
FIGS. 2A and 2B are simplified illustrations of HMD user interfaces for navigational applications in which persistent data elements are located in the user's field of view.

FIG. 2A illustrates the view 200-1 from the perspective of a user wearing an HMD, in which the HMD displays data elements 210 related to a navigational application while the user is moving. This approach, however, can be problematic for at least two reasons. First, the data elements 210 may be difficult to see. Because HMD display technologies may be unable to display data elements 210 with much contrast to other objects in the user's view, and because a navigational application can include outdoor navigation in bright daylight, some data elements 210 can be difficult to see. This can be particularly true of certain data elements 210-1 displayed at or near the top of the user's view, which often can be subject to bright backgrounds, such as the sky.

Figure 2B:
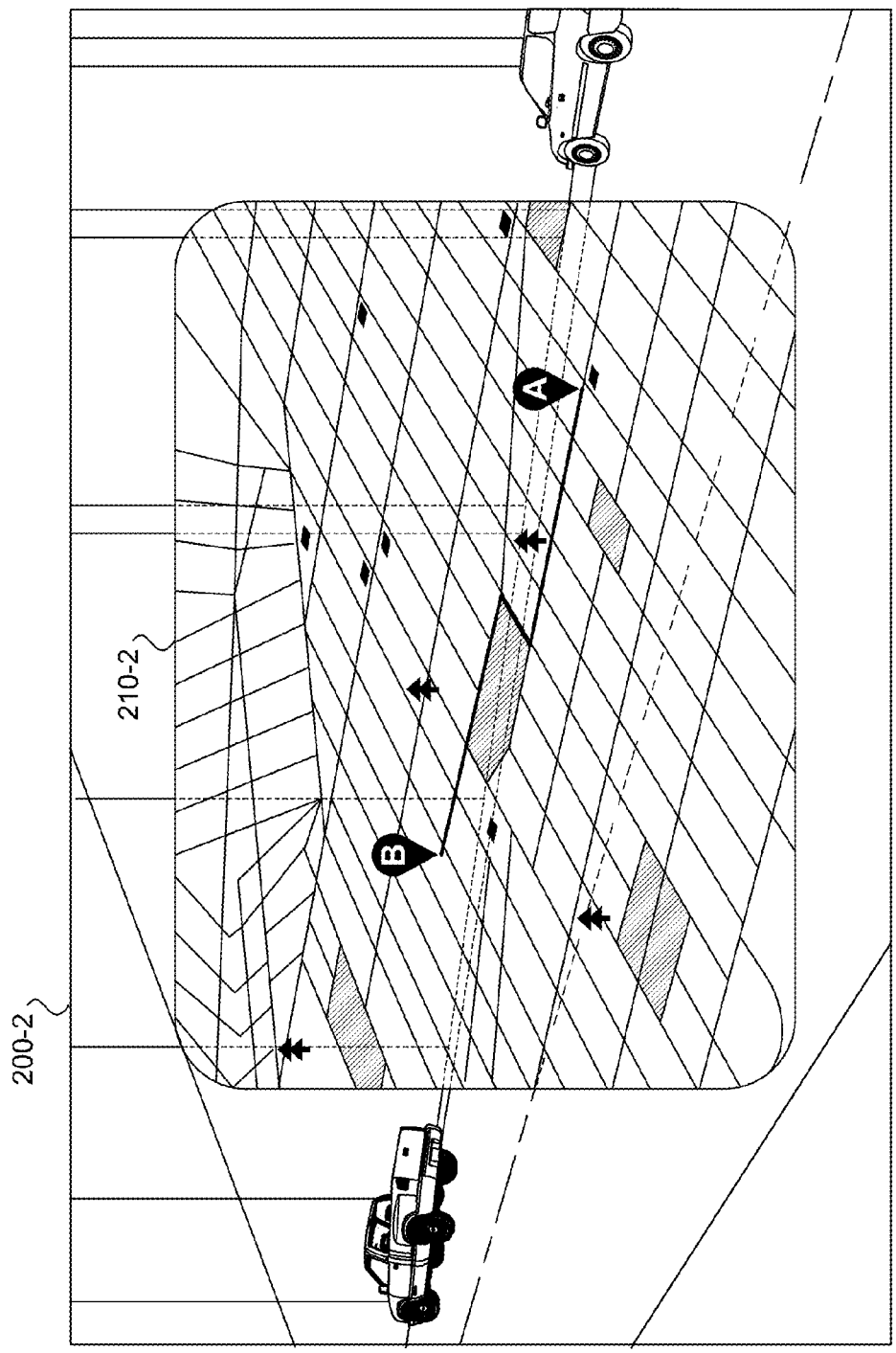

Second, data elements 210 can be distracting and obstructive. This is especially true when data elements are large. FIG. 2B illustrates an example in which a navigational application for an HMD displays a large data element 210-2—a map showing an entire navigational route—in the center of the user's view 200-2. Although the large data element 210-2 may be semi-transparent, it can still distract a user from seeing what may be directly ahead.

Embodiments described herein provide for displaying elements at an HMD, for example in an HMD UI (which can be executed by the HMD 120 of FIG. 1), which can keep one or more persistent data elements outside the user's initial field of view. The UI can make these data elements accessible to the user 110 through a head movement, such as a head tilt (i.e., movement about a horizontal axis) and/or rotation (i.e., movement about a vertical axis). For example, when the HMD 120 determines that the user's head is tilted downward, one or more persistent data elements can be shown at the bottom of the user's field of view. Embodiments in which the user's head is tilted downward to access persistent data elements can utilize the better contrast the ground typically offers for viewing displayed information and exploit the fact that, in some implementations, the tilting of the head may be more reliably detected than the movement of the head side to side. Even so, embodiments may additionally or alternatively display persistent data elements in other regions of the user's field of view based on detecting the user's head tilting upward and/or looking right or left.

Figure 3A:
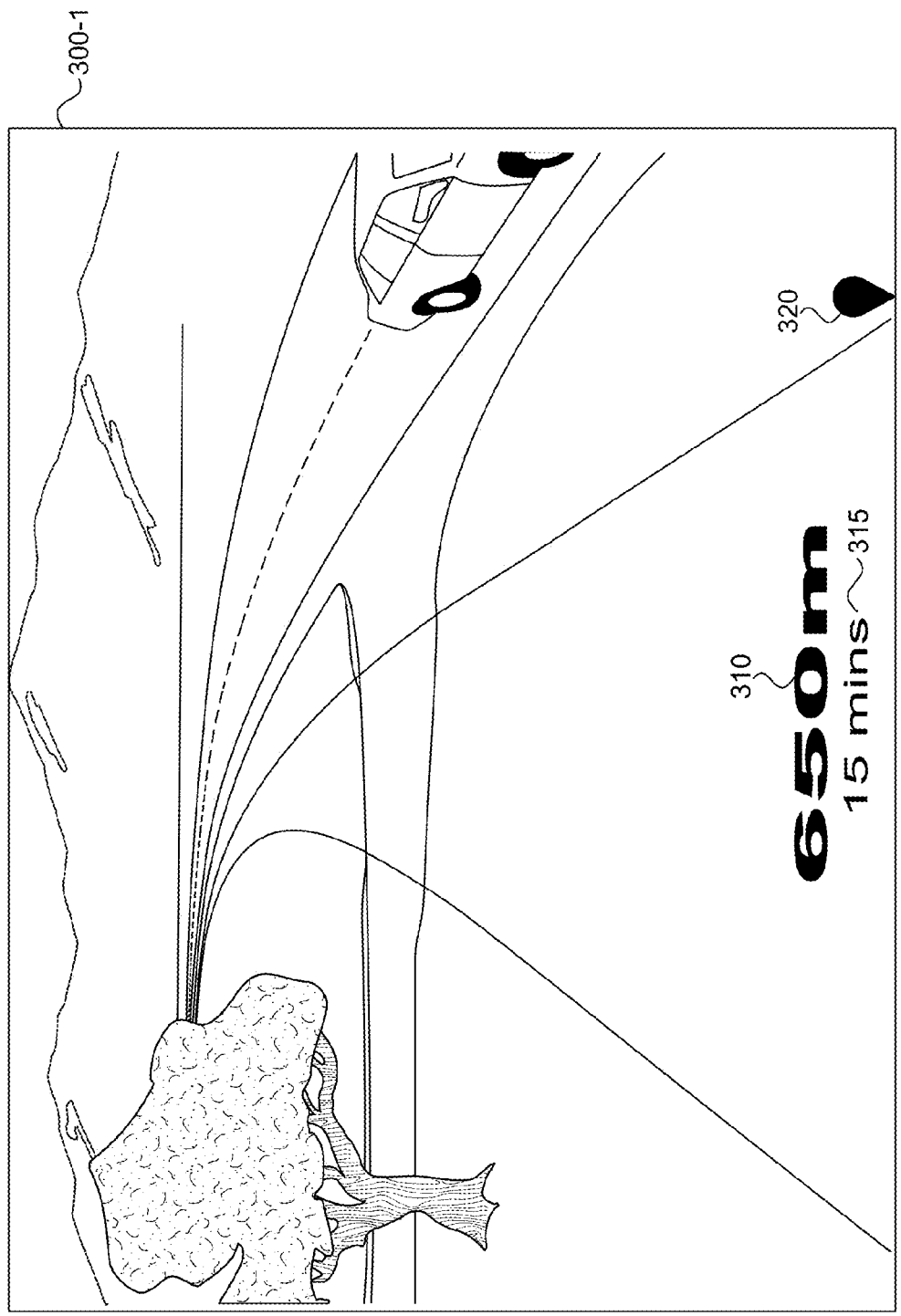
FIGS. 3A and 3B are simplified illustrations of a user interface of an HMD in which persistent data elements are kept outside a user's initial field of view, according to one embodiment.
Figure 3B:
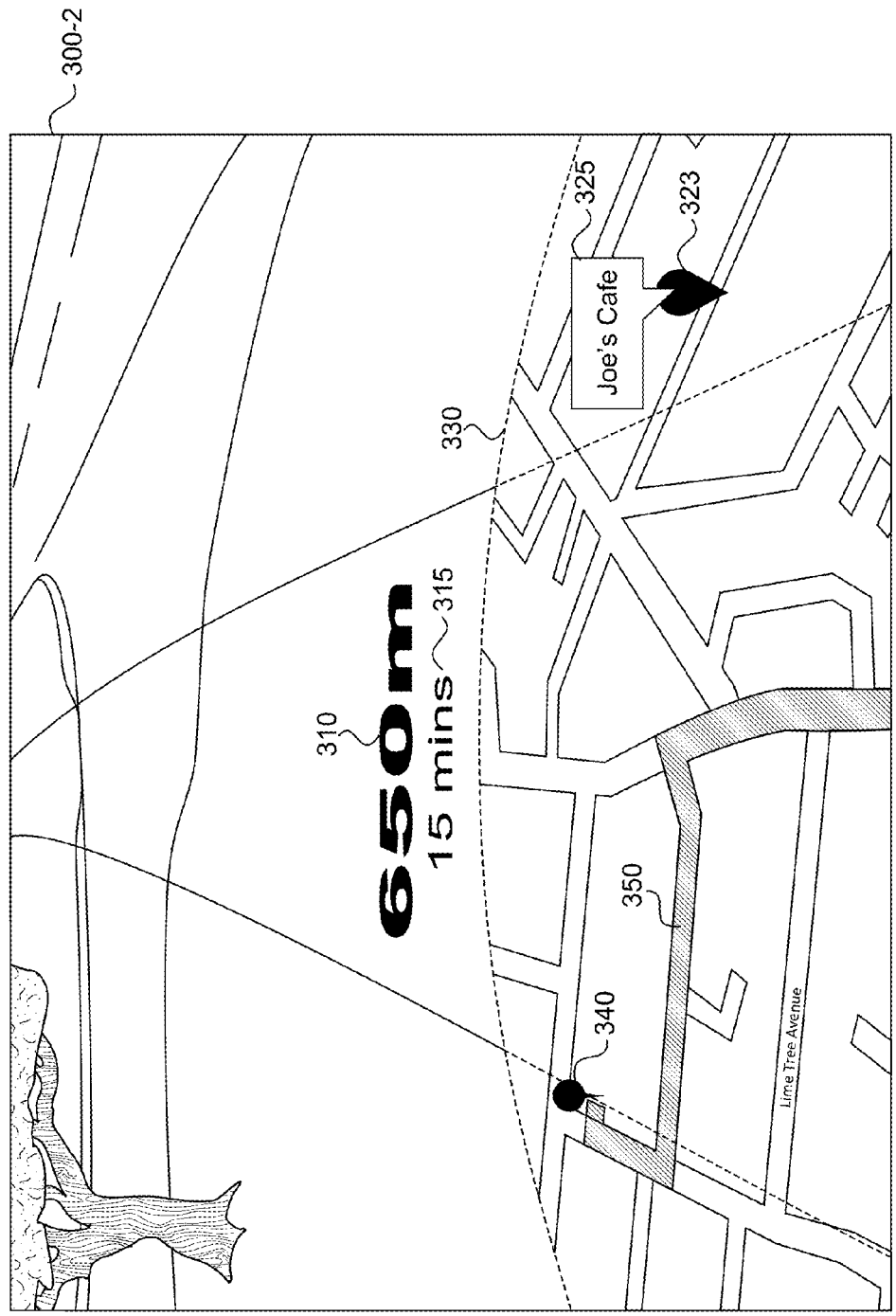

As used herein, the term "persistent data elements" refers to data elements that are accessible regardless of a user's surroundings, such as application data, icons (e.g., a virtual "desktop"), and the like. However, some persistent data elements, such as the maps described in further detail below, can be updated based on a user's location, direction of travel, field of view, and the like. FIGS. 3A and 3B illustrate embodiments of how accessing persistent data elements can work.

FIG. 3A is an illustration of a first field of view 300-1 of a user 110 of an HMD 120, as seen by the user 110. Depending on the type of HMD utilized, the first field of view 300-1 of the user 110 can be limited according to the display capabilities of the HMD 120. For example, the first field of view 300-1 may vary depending on the size, shape, and/or technology utilized by the display portion of the HMD 120. A person having ordinary skill in the art will recognize many alterations and variations.

In this embodiment, the HMD 120 displays information from a navigation application in which some data elements 310, 315, 320 can be displayed near the bottom of the first field of view 300-1. These data elements can include navigation elements relevant to a current navigational route, such as a distance 310 and/or estimated time remaining 315. The navigation elements may appear to the user to be displayed on a ground surface. Additionally or alternatively, these data elements can include a point-of-interest (POI) indicator 320, indicating that a nearby POI is viewable on a map. In this embodiment, however, the map is not yet shown. As indicated below, the POI indicator 320 is anchored to a location viewable on a map (currently outside the field of view of the user). Other data elements may be anchored to items outside a current or expected field of view of the user. In some embodiments, some or all of the data elements 310, 315, 320 shown in FIG. 3A may be hidden from the user's first field of view 300-1, and accessible, along with the map, in the manner described below.

FIG. 3B is an illustration of a second field of view 300-2 of a user 110. Here, the second field of view 300-2 is obtained when the user's head tilts downward. The HMD 120 displays a map 330 of the navigation application in the second field of view 300-2. The map can be centered at the user's current location such that, for embodiments enabling a user to view different portions of the map with further head movement, the user may look downward to see the user's current location marked by a data element (not shown) superimposed on his or her feet. In some configurations, the map 330 can be hidden again when the user's head tilts upward. Additionally or alternatively, the HMD 120 may continue to display the map 330 until the HMD 120 detects a certain triggering event, such as a certain head movement and/or other user input (e.g., hand gesture, audio command, touchpad input, etc.), a certain amount of time has passed, the user has moved a certain distance, etc.

The map 330 can be displayed in any of a variety of ways, depending on the desired functionality. In the embodiment shown in FIG. 3B, for example, the map 330 is displayed as a circle or disk, viewable to the user when the user tilts his or her head downward. As indicated previously, however, other embodiments may allow the user 110 to view the map 330 my tilting his or her head upward, or rotating his or her head left and/or right. Further, depending on the display capabilities of the HMD 120, the map 330 can appear, from the user's perspective, to be in or on a plane of a physical surface (e.g., the ground) on which the user is located. The HMD 120 may utilize an outward-facing camera, ultrasound, and/or user settings to determine the physical surface on which to overlay the map 330. Such functionality can be easier for a user to view because it is shown on a focal plane on which the user is already likely focused. However, additionally or alternatively, the map 330 may be presented, from the user's perspective, at a certain distance from the user that is independent of the ground and/or other objects in the user's environment (e.g., a "bar" that appears along an edge of the display). That is, the map 330 can be at a certain focal plane from the user, which can appear to the user as though it is standing up or angled away. Other embodiments or configurations may include a map 330 or other data elements with multiple focal planes. The map can further be oriented in the direction of travel and appear to be fixed to a ground surface such that, if the user turns in a particular direction, the map will rotate accordingly. Moreover, the map can be updated (e.g., periodically, based on detected movement, etc.) while in the user's view.

Depending on desired functionality, the map 330 may include different elements. As illustrated, these elements can include a suggested navigational route 350 and a destination indicator 340. The map 330 may also include textual labels for streets and/or other landmarks shown on the map 330, representations of buildings, one or more indicators of current conditions (e.g., showing traffic conditions), and the like. In some embodiments, user settings may govern whether these elements are shown on the map 330 and/or how the map is invoked, displayed, etc.

One or more POIs can also be indicated on the map 330 using corresponding POI indicator(s) 323 and/or label(s) 325. The POI(s) may be personalized to a user 110 and/or HMD 120, and/or may be retrieved from a general database. Personal POIs can be determined from previous destinations, current and/or prior POI searches (e.g., cafes), and the like. Additionally or alternatively, POIs may be received from and/or determined using information from other applications of the HMD 120 and/or other devices (e.g., a mobile phone, Internet-accessible database, etc.).

As shown in FIG. 3A, embodiments can show the POI indicator(s) 320 in the first field of view 300-1 along, for example, the bottom of the first field of view 300-1 (or other edge or horizon line, depending on the embodiment). The POI indicator(s) 320 may appear once the corresponding POI(s) are within range to be shown on the map 330 when the map 330 is invoked (e.g., when the user tilts his or her head downward). Furthermore, the position of the POI indicator(s) 320 at the bottom of the first field of view 300-1 may correspond with the POI(s) location on the map such that, when the user's head rotates (which would rotate the map 330, if in view), the POI indicator(s) 320 move along the bottom of the first field of view 300-1 correspondingly. In some embodiments, the POI indicator(s) 320 at the bottom of the first field of view 300-1 can include a label 325 or other data element indicating the name of the POI. Some embodiments may show the POI indicator(s) 320 at an outer edge of the map 330 or at a horizon viewable by the user if the corresponding POI(s) is/are outside the sight of the user or farther away than the map area being shown.

Thus, the first field of view 300-1 can be an "expected" or "normal" field of view of the user 110 in which data elements are hidden and/or minimized along an edge portion of the first field of view 300-1. The second field of view 300-3 is a field of view in which additional data elements can be shown with less concern that the data elements will be distracting or obstructive.

The HMD 120 can differentiate the first field of view 300-1 from the second field of view 300-2 in any of a variety of ways. In some configurations, the first field of view 300-1 can be established by the head orientation and/or movement of a user. For example, the HMD 120 can determine a first field of view when sensors (e.g., accelerometers, gyroscopes, GPSs receivers, etc.) indicate that a user's head is upright and/or the user is traveling in a direction the user is facing. In some configurations, the first field of view 300-1 can be established from user input. For example, a user may say a voice command, make a hand gesture, and/or provide some other input to indicate to the HMD 120 that a current field of view is the user's "normal" field of view. Such functionality may vary from application to application, or may be integrated into an operating system of the HMD 120.

In operation, a user could use the HMD interface illustrated in FIGS. 3A and 3B as follows: a user 110 uses the HMD 120 to select and execute a navigation application using any combination of input mechanisms (touch pad, voice commands, hand gestures, head and/or body movements, etc.). The user then inputs a destination to which to navigate, again by using any of a variety of input mechanisms such as speaking the name or address of the destination and/or selecting the destination from a list of locations. Once the destination is selected, the HMD 120 can choose a route. The route can be calculated locally and/or obtained using information received via the Internet, for example. Once the route is determined, the HMD 120 can provide audio and/or visual navigational prompts to guide the user along the route. As the user moves along the route, the HMD 120 determines that the user has an "expected," first field of view 300-1, and displays certain data elements 310, 315, 320 in the manner described in relation to FIG. 3A, or omits them altogether. In embodiments in which nearby POI indicator(s) 320 are displayed in the first field of view 300-1, they may appear along the bottom edge of the display as the user approaches them along the route, indicating to the user that the POI is nearby and can be seen on the map 330. (See FIG. 3A, for example.) In this embodiment, the user may tilt his or her head downward at any time (e.g., along the route) to see a second field of view 300-2 and access the map 330 and any data elements (e.g., suggested navigational route 350, destination indicator 340, POI indicator(s) 323 and/or label(s) 325 of nearby POI(s), etc.) displayed thereon and/or associated therewith. (See FIG. 3B, for example.) The map can appear as though it were a disk on which the user is standing, and the user may be able to view different parts of the map 330 by further tilting and/or rotating his or her head. Of course, this is an example, and other embodiments contemplated herein can include different features. Embodiments may allow some or all of the features discussed in this example to be omitted and/or altered by way of user preferences and/or settings that are changeable via, for example, a menu of the navigational application.

Figure 4B:
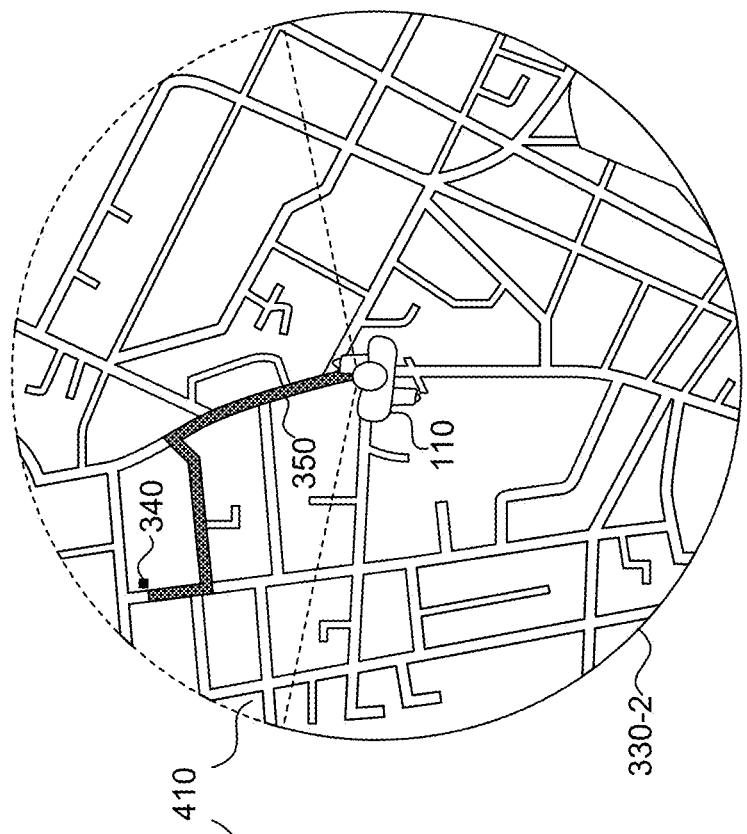
FIGS. 4A and 4B are illustrations of overhead views of a map, showing optional zoom functionality of the map, according to some embodiments.
Figure 4A:
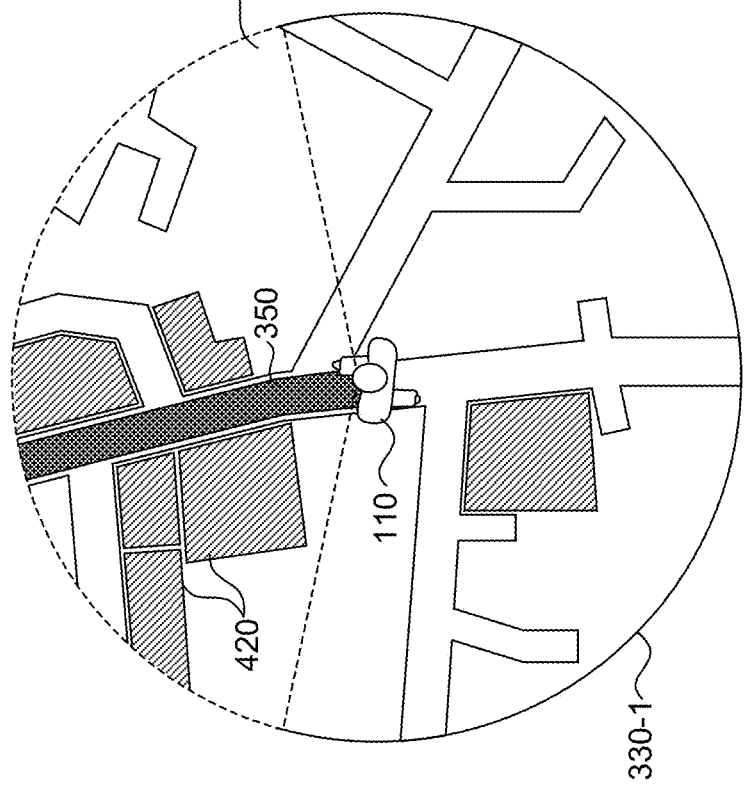

FIGS. 4A and 4B are illustrations of overhead views of the map 330, showing optional zoom functionality of the map, according to some embodiments. As discussed above, the map can be centered at the location of the user 110. Portions 410 of the map 330 outlined with dotted lines indicate the portions of the map 330 that may be currently viewable to the user when the map is displayed, as shown in FIG. 3B, which can change as the orientation and/or direction of the user's head changes. The HMD 120 can determine what portions of the map 330 may be in the user's field of view, and provide corresponding POI indicator(s) as described above. Depending on desired functionality, the user can zoom the map 330 in and/or out by providing input in any of a variety of ways (e.g., voice commands, head movements, hand gestures or other motions, and the like).

FIG. 4A illustrates a configuration in which the map 330-1 is in a relatively zoomed-in state. That is, the map 330-1 illustrates a relatively small portion of the user's surroundings. However, when zoomed in, the map may show details 420 that are not viewable when the map 330 is zoomed out. Such details 420 may include buildings, street names, location names, and the like. As indicated in FIGS. 3A and 3B, the map can show a suggested navigational route 350 if provided by the navigational application.

FIG. 4B illustrates a configuration in which the map 330-2 is in a relatively zoomed-out state. That is, the map 330-1 illustrates a relatively large portion of the user's surroundings. Although, when zoomed out, the map may not show some of the details that are viewable when the map 330 is zoomed in, the map 330-2 in a relatively zoomed-out state can provide additional features, such as the destination indicator 340 and/or POI indicator(s) 323 (not shown) that are not viewable when the map 330 is zoomed in.

Figure 5A:
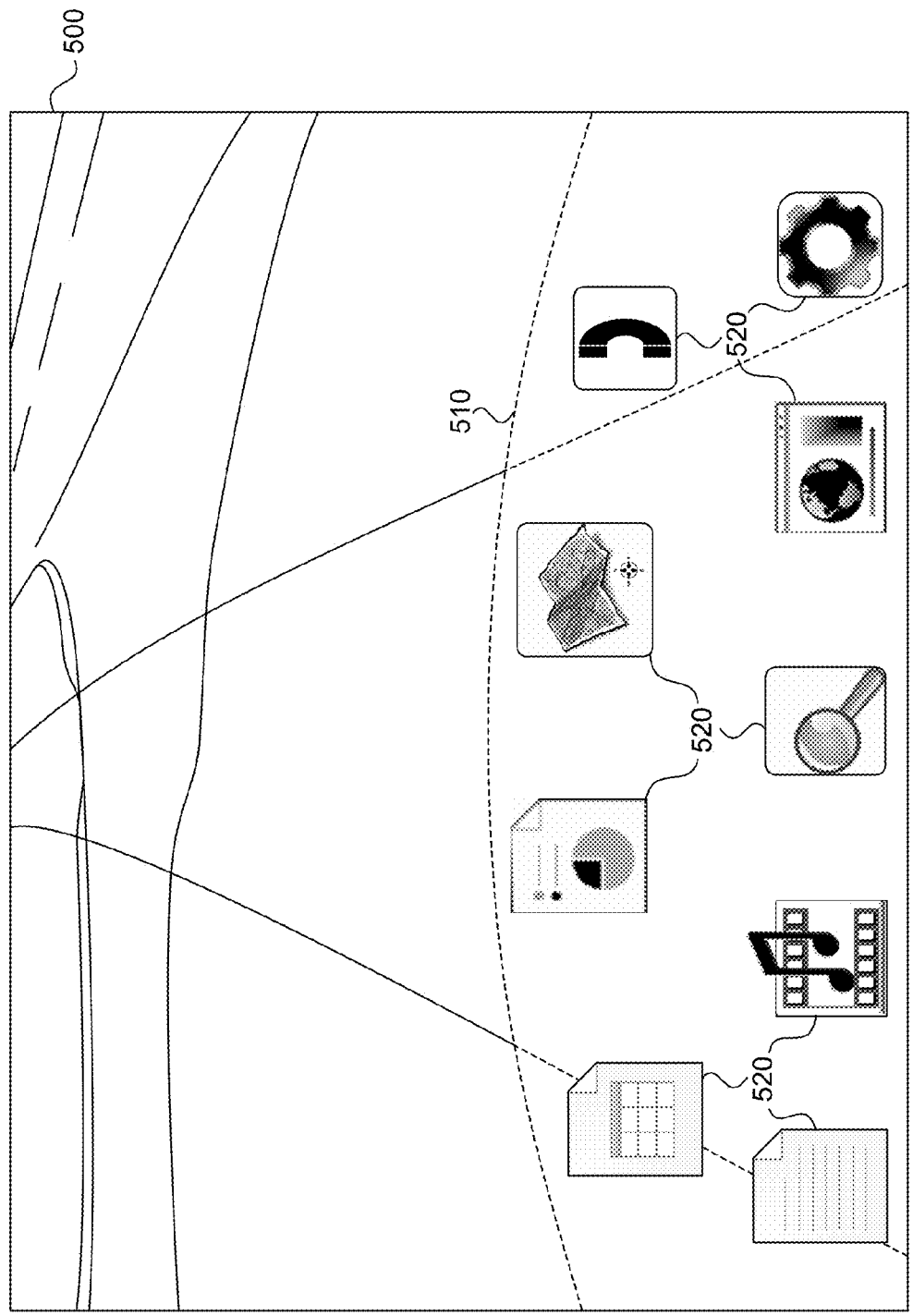
FIG. 5A illustrates how a user may access a "desktop" of persistent data elements, according to one embodiment.

The functionality illustrated in FIGS. 3A-4B can be extended to applications beyond navigation. For example, FIG. 5A, illustrates how a user may tilt his or her head downward from an initial field of view to obtain a field of view 500 in which a persistent data portion 510 of the field of view displays a "desktop" of persistent data elements 520, such as icons representing different executable applications, data, and/or functions for selection and/or execution by the HMD 120. Such functionality can be provided by, for example, an operating system of the HMD 120, although other applications may have similar functionality. Some embodiments may additionally or alternatively anchor (or otherwise associate) persistent data elements 520 to objects in the user's view (e.g., floor, building, etc.). Optionally, embodiments may position the persistent data elements 520 in one or more places in a user's field of view determined to provide good contrast for viewing.

Other features and functions of the persistent data portion 510 can be similar to the map 330 as described with relation to FIGS. 3A-4B. For example, additional elements may be viewed when a user tilts his or her head downward even further and/or rotates his or her head to one side or the other. Therefore, in some embodiments, the map 330 of the embodiments shown in FIGS. 3A-4B is replaced with a persistent data portion 510 that can appear, from the user's perspective, on a virtual surface that is approximately parallel or coincident with a ground surface on which the user is situated. The persistent data portion 510 may be disk shaped, as shown in FIG. 5, or take on any of a variety of other shapes, depending on desired functionality.

In addition or as an alternative to allowing a user to select persistent data elements 520 (and/or interact with the user interface of the HMD 120 in other ways) using gestures, movement, and/or other techniques described herein above, embodiments may also have eye-tracking features—such as one or more cameras and/or infrared emitting elements directed generally toward one or both of the user's eyes—that enable an HMD 120 to utilize gaze detection to receive user input. For example, a user may select one of the persistent data elements 520 using gaze in any of a variety of ways, such as looking at a persistent data element 520 and performing an action (e.g., blinking, winking, speaking, performing a gesture, making another movement, etc.) and/or looking at a persistent data element 520 for a threshold amount of time.

Moreover, similar functionality can be utilized to evoke the persistent data portion 510. For instance, an embodiment can allow a user to make the persistent data portion 510 appear (e.g., slide in, pop up, etc.) by gazing at an area of the display for a threshold amount of time. To use a specific example, an embodiment may allow a user to evoke the persistent data portion 510 by maintaining his or her head level while look at the bottom portion of the field of view 500 for 2 seconds. Other embodiments may use more or less time (e.g., 0.5, 1, 3, 5, or 10 seconds, etc.) and/or a different area of the field of view (e.g., the top, sides, a certain quadrant, a "menu" icon, etc.), which may depend on desired functionality, user settings, and/or other factors. Gaze may also be used to select on or more of the persistent data elements 520, which may, among other things, execute an application, display additional information related to the selected persistent data element(s) 520, and the like.

Figure 5B:
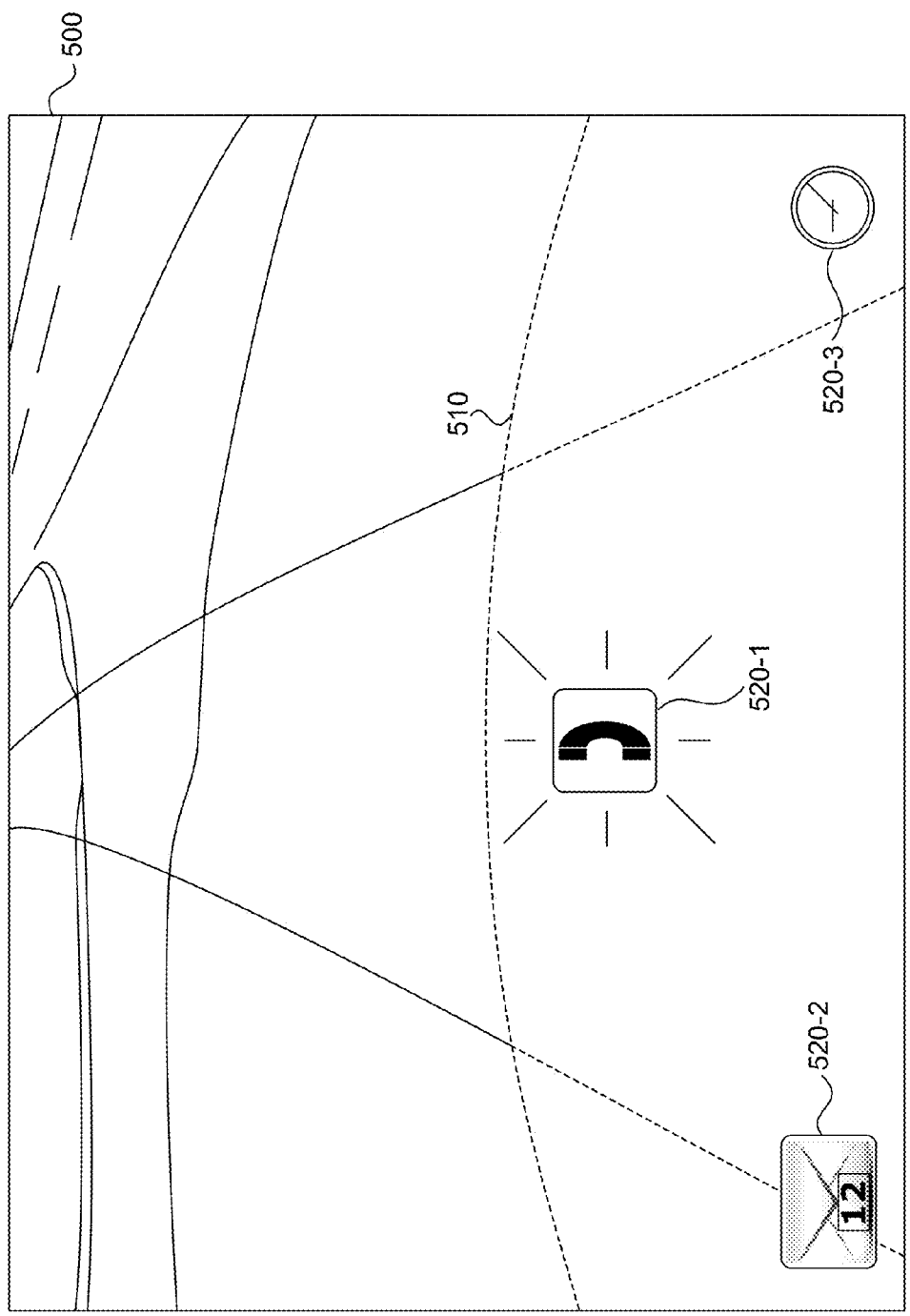
FIG. 5B illustrates an alternative embodiment in which persistent data elements comprise alerts and icons.

The persistent data elements 520 illustrated in FIG. 5A are provided as non-limiting examples of data elements that may be shown. Depending on desired functionality any of a wide variety of persistent data elements may be shown. For example, FIG. 5B illustrates an embodiment in which persistent data elements 520 include a blinking icon 520-1 indicative of an incoming call, a message icon 520-2 showing a number of new emails, and a clock icon 520-3 indicating the current time. Embodiments may vary. In general, persistent data elements 520 can comprise any of a wide variety of elements indicative of informational items (e.g., clocks, calendars, stock tickers, social media status, social media posts, signal strength, battery life, etc.) executable applications (e.g., appointments/calendar, spreadsheet, word processor, presentation software, map, media player, Internet and/or device search, web browser, telephone, settings, social media application, and the like), widgets, alerts (e.g., messages received, incoming message and/or call, weather alerts, etc.), notifications, application data (e.g., heartrate, breathing, calories burned, timer, etc. might be used in fitness or healthcare applications; other data may be shown in relation to one or more other applications), and the like.

Embodiments may also allow users to customize the persistent data elements 520 by choosing which persistent data elements 520 appear, and where they are located. For example, embodiments may allow a user to make hand gesture to adjust a location of at least one of the elements (e.g., by making corresponding "grabbing" and "dropping" hand gestures). Other properties of the persistent data elements 520 besides location may also be adjusted with hand gestures. As indicated previously, detecting hand gestures may be performed using one or more outward-facing cameras and/or other optical sensors. Additionally or alternatively, hand gestures can be detected by ultrasound using a microphone sensitive to ultrasonic frequencies, a sensor for electromagnetic radiation, and/or by sensors that may be held or carried by the user, for example a device with a gyroscope, accelerometer, and/or other motion and/or position sensors communicating information via wireless RF communication, infrared (IR) light, etc. In some embodiments, such device may comprise a mobile phone used to at least partially control operation of the HMD.

Figure 6:
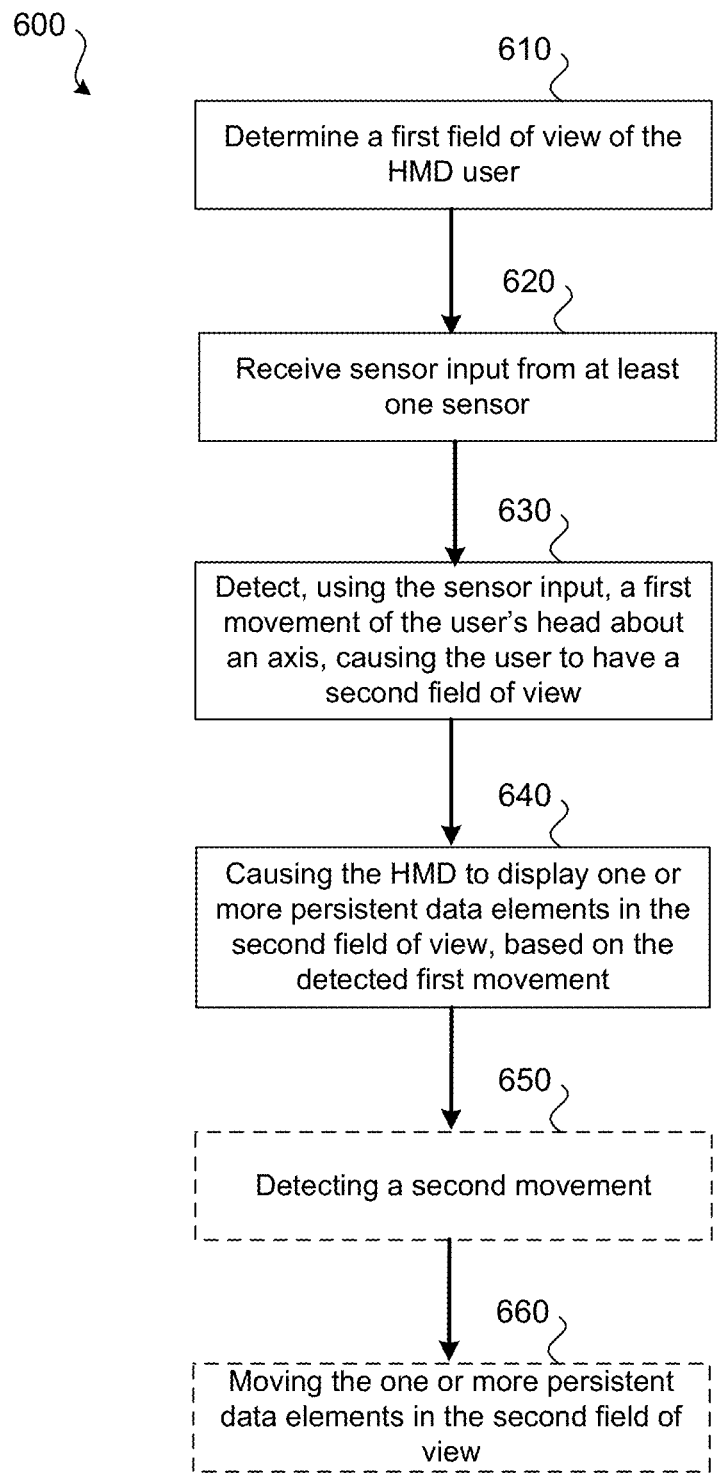
FIG. 6 illustrates an embodiment of a method for causing persistent data elements to be displayed in an HMD user interface, according to one embodiment.

Various methods may be performed to display data by a see-through HMD in the manner shown in the embodiments described above. FIG. 6 illustrates such a method 600, according to one embodiment. The method 600 may involve the use of an HMD device by a user, and may include the HMD 120 of FIG. 1. Means for performing any or all of the illustrated blocks of the method 600 include an HMD, which may further include a see-through display, one or more cameras, a processing unit, a memory, movement and/or orientation sensors, and/or one or more features of the computer system 700 of FIG. 7. More generally, steps of the method 600 may be performed by a computerized device, such as a computer system.

At block 610, a first field of view of the HMD user is determined. As indicated previously, this can be done using any of a variety of methods, which may depend on desired functionality, application, and/or user settings. For example, where persistent data elements are to be accessed by a user by tilting his or her head downward, determining the first field of view of the HMD user may comprise determining, using sensor input, that the HMD user's head is upright. In other embodiments or configurations, determining a first field of view may additionally or alternatively comprise determining that a user is moving in a certain direction (e.g., a direction the user is facing), has moved in a certain direction for a certain amount of time or distance, has not tilted and/or rotated his or her head for a certain amount of time, etc. In some embodiments, the first field of view is determined based on camera input from the HMD. The functionality performed at block 610 can be performed by one or more of the various components of an HMD and/or device communicatively coupled therewith, including a processing unit, input devices (e.g., sensors), operating system, application(s), and/or output devices, as described in FIG. 7, and/or similar means.

Sensor input is received from at least one sensor at block 620, and at block 630, the sensor input is used to detect a first movement of the user's head about an axis, causing the user to have a second field of view. The sensor input can be received from any of a variety of sensors, which may be integrated into and/or communicatively coupled with the HMD. The sensor input can be received from one or more gyroscopes, accelerometers, GPS receivers, magnetometers (and/or similar orientation sensors), altimeters, and/or other sensors capable of providing data indicative of a user's movement. Sensor input can indicate movement of the user's head about an axis, such as a horizontal axis (e.g., upward and/or downward tilting of the user's head) or a vertical axis (e.g., rotation of the user's head left and/or right). In particular, tilting of the user's head may result in a spike in acceleration, indicated by the acceleration data, offset by gravitational acceleration. The corresponding acceleration of the spike can vary, depending on the motion, location of the accelerometer, and/or other factors. A gyroscope may similarly measure rotational movement of the user's head left and/or right.

In one embodiment, a user's gaze may also be taken into account to help an HMD and/or device communicatively coupled therewith to distinguish between whether a user is just stretching or jittering or bobbing their head or whether the user meant to move in a particular direction. For example, when a rotation and/or tilt of a user's head is preceded by and/or concurrent with a change in the user's gaze in that direction, it may mean that the user is focusing his or her attention to a new location, which may be indicative of a change in direction. In such a scenario, the persistent data elements may remain hidden, so as not to distract the user or obstruct the user's view. On the other hand, if a user's gaze remains static (despite the head tilt and/or rotation) and/or moves in a direction opposite the head movement, it may be indicative of a movement in which the user's focus has not changed. In this instance, persistent data elements may be shown. A user can exploit these differences in head motions and gaze to indicate whether persistent data elements are to be shown. That said, some embodiments may have functionality reverse from the functionality described above (e.g., a head movement with a change in focus evokes persistent data elements, for example when a user turns his head in one direction and gazes all the way toward that direction such as toward a corner of his eyes, or where a head movement with no change in focus or a change that is opposite movement of the HMD doesn't evoke persistent data elements, for example because a user continues to look ahead but his head is moving around), which may be based on user settings. In some embodiments, eye movement less than and/or more than a threshold may be used to determine whether to display persistent data elements. For example, when gaze changes less than a first threshold or is opposite a direction of movement of the user's head, it may be determined that the user is just bobbing their head and does not wish to display the persistent data elements. Continuing with this example, if the user turns his head and also shifts his gaze in that direction beyond a second threshold, it may be determined that the user is attempting to evoke display of the persistent data elements. Further, in this example, if the user's head turns, but gaze shift is between the first and second thresholds and/or is in the same direction as the head movement, it may be determined that the user has changed his focus and does not wish to evoke the persistent display elements.

The functionality performed at blocks 620 and 630 can be performed by one or more of the various components of an HMD and/or device communicatively coupled therewith, including a processing unit, input devices (e.g., sensors), operating system, application(s), communication subsystem, and/or output devices, as described in FIG. 7, and/or similar means. Where sensors are not incorporated into the device receiving sensor input, a communication subsystem can be configured to receive sensor input via, for example, wireless and/or wired means. Again, such wireless and/or wired means are as described in more detail below with regard to FIG. 7.

At block 640, one or more persistent data elements are displayed with the HMD in the second field of view, based on the detected first movement. In some embodiments, such as those described previously, the data element(s) may be shown in a portion of the second field of view that is not viewable in the first field of view, but other embodiments are not so limited. A downward tilt of the head may evoke data elements to be shown on side and/or upper portions of the second field of view, which may have been viewable in the first field of view. In some embodiments, data elements may continue to be shown in the user's first field of view. For example, a downward tilt of the head may evoke data elements that remain displayed even after the user tilts his or her head back upward to restore the his or her first field of view. As discussed previously, the user may be able to remove the data elements upon a triggering event, such as the passage of a certain amount of time, a gesture, a voice command, and the like. In some embodiments, when the user returns to the first field of view, one or more of the persistent data elements cease to be displayed. The functionality performed at block 640 can be performed by one or more of the various components of an HMD and/or device communicatively coupled therewith, including a processing unit, operating system, application(s), communications subsystem, and/or output devices (e.g., display), as described in FIG. 7, and/or similar means.

Put differently, blocks 630 and 640 of the method 600 may include detecting a movement of a head of a user wearing an HMD with display elements that are at least semi-transparent. In response to detecting the movement, the one or more persistent data elements may be caused to be displayed on the HMD such that the elements are overlaid on a portion of a scene viewable by the user through the semi-transparent display elements. Detecting the head movement can include determining that the user has moved the head such that at least a portion of an expected field of view is no longer visible to the user. Additionally or alternatively, detecting movement of the head can include determining that the user has moved the head such that at least a portion outside of an expected field of view is visible to the user. The persistent data elements can be displayed in the portion outside of the expected field of view.

Optionally, the process may include detecting a second movement at block 650, and, at block 660, moving the one or more persistent data elements in the second field of view. For example, in contrast to embodiments in which one or more data elements may be shown in a fixed position relative to the user's field of view, detecting a second movement may include detecting head tilting and/or rotation that results in the corresponding movement of data element(s) within the user's field of view. Additionally or alternatively, the second movement may prompt a map (or other data element) to zoom in and/or out, as is illustrated in FIGS. 4A and 4B. Other detected movements may prompt the HMD to manipulate data element(s) in other ways. The functionality performed at block 640 can be performed by one or more of the various components of an HMD and/or device communicatively coupled therewith, including a processing unit, operating system, application(s), communications subsystem, input devices, and/or output devices (e.g., display), as described in FIG. 7, and/or similar means.

It should be appreciated that the specific blocks illustrated in FIG. 6 provide an example of a method 600 of displaying data by a see-through HMD. Alternative embodiments may include alterations to the embodiment shown. For example, alternative embodiments may include detecting specific movements that evoke specific data elements. For example, once a first, "expected" field of view is established, a detected downward tilt of the user's head could evoke navigational data elements, while an upward tilt and/or sideways rotation of the head may evoke other data elements, such as a desktop and/or data elements related to an application other than the navigational application. Additional features may be added, removed, or combined depending on the particular applications. One of ordinary skill in the art would recognize many variations, modifications, and alternatives.

As indicated previously, in addition or as an alternative to embodiments in which persistent data elements are displayed in the second field of view, embodiments may also enable persistent data elements to be shown in a first field of view, based on certain activation motions. For example, a user may be able to evoke persistent data elements by nodding his or her head, or quickly rotating the head to the side and back. The persistent data elements can then be evoked, sliding in or popping up in the first field of view. Thus, in such embodiments, the user's head position will return to approximately the same place so that the first field of view is approximately the same, but an activation motion will cause the persistent data elements to be displayed. In some embodiments, the persistent data elements to be displayed may be determined by which direction the activation motion is performed (e.g., left, right, up, or down). Moreover, some embodiments may provide for a deactivation motion that removes the persistent data elements from the first field of view once they are evoked. For example, a short head rotation in the same direction or opposite direction, shaking the head back and forth, and the like. These types of short head rotations or nods might be detected from two rapid movements in opposite directions. That said, activation and/or deactivation motions may comprise any of a variety of other types of movements.

FIG. 7 illustrates an embodiment of a computer system 700, which may be incorporated into and/or communicatively coupled with an HMD. One or more components of the computer system 700 could be shared between different devices, such as an HMD, smart phone, tablet, personal computer, or other computing device. In some embodiments, software and other applications (such as the navigational application described herein) could be run on a separate device communicatively linked to the HMD. In other embodiments, an HMD may have some or all of the computer system 700 integrated therewith.

FIG. 7 provides a schematic illustration of one embodiment of a computer system 700 that can perform the methods provided by various other embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include a processing unit 710, which can include without limitation one or more general-purpose processors, one or more special-purpose processors (such as digital signal processors, graphics acceleration processors, and/or the like), and/or other processing means, which, as stated above, can be utilized to perform various steps, such as one or more of the blocks shown in FIG. 6. The bus 705 may couple two or more of the processors 710, or multiple cores of a single processor or a plurality of processors. Hardware elements may also include one or more input devices 715, which can include without limitation one or more GPS receivers (and or receivers from any other Satellite Positioning System (SPS)), accelerometers, gyroscopes, magnetometers (and/or other orientation sensors), altimeters, cameras, and/or other sensors to be able to detect location, motion, orientation, light, sound, and the like, which can be utilized as means for gathering position, movement, and other data. Moreover, sensors may be utilized, together with the processing unit 710, as means for detecting the movement of an HMD user's head, as described herein. Other devices such as a touch pad, keyboard, microphone, and/or the like may also be included. One or more output devices 720 are also included. These output devices can include one or more displays and/or other display means, as well as speakers and/or other devices, which may be utilized to perform one or more steps as described in relation to FIG. 6.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 702.11 device, a WiFi device, a WiMax device, cellular communication facilities, etc.), and/or the like. The communications subsystem 730 may include one or more input and/or output communication interfaces to permit data to be exchanged with a network, other computer systems, and/or any other electrical devices/peripherals. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application(s) 745, which may comprise computer programs provided by various embodiments, and/or may be designed to implement methods, and/or configure systems, provided by other embodiments, as described herein. Merely by way of example, a portion of one or more procedures described with respect to the method(s) discussed above, such as the method 600 described in relation to FIG. 6, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 725 described above. In some cases, the storage medium might be incorporated within a computer system, such as computer system 700. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to the processing unit 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processing unit 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processing unit 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processing unit 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Further, although embodiments are described herein with respect to an HMD, those of skill in the art will appreciate that other forms of head-mounted displays may be utilized. For example, embodiments described herein may be implemented with respect to one or more contact lenses that a user may wear and/or may be implemented in another form of display through which a user may perceive a field of view. Moreover, although embodiments are described herein with respect to a see-through HMD, techniques disclosed herein may be extended to other types of HMD, which may utilize cameras to capture images of the user's environment, which are then displayed to the user.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for displaying data by a see-through head mounted display (HMD):
   determining a first field of view of a user of the HMD;
   receiving sensor input from at least one sensor;
   detecting, using the sensor input, a first movement comprising a downward tilt of the user's head, causing the user to have a second field of view; and
   causing the HMD to display one or more persistent data elements in the second field of view, based on the detected first movement;
   wherein:
      the one or more persistent data elements comprise a map that appears, from a perspective of the user, in a plane of a physical surface on which the user is located;
      causing the HMD to display the one or more persistent data elements is independent of physical objects viewable in the second field of view, and
      the one or more persistent data elements were not displayed in the first field of view.

2. The method of claim 1, further comprising determining the first field of view is an expected field of view.

3. The method of claim 1, wherein the map includes at least one of:
   a destination,
   a location of the user, or
   a point of interest.

4. The method of claim 3, wherein the map includes the point of interest, the method further comprising displaying, within the first field of view of the user, a data element indicative that the map includes the point of interest.

5. The method of claim 1, further comprising:
   receiving an input from the user, and
   zooming the map in or out, based on the received input.

6. The method of claim 1, further comprising:
   detecting a second movement; and
   moving the one or more persistent data elements in a manner corresponding to the second movement.

7. The method of claim 1, wherein the one or more persistent data elements comprise one or more icons representative of executable applications.

8. The method of claim 1, wherein the at least one sensor comprises at least one of:
   an accelerometer,
   a gyroscope,
   a magnetometer,
   a camera,
   a Satellite Positioning System (SPS) receiver, or
   an altimeter.

9. An apparatus comprising:
   a memory; and
   a processing unit communicatively coupled with:
      the memory;
      one or more motion sensors configured to sense movement of a user of a see-through head mounted display (HMD); and
      a display of the HMD, the display configured to show data elements in a user's field of view while allowing the user to view physical objects in the user's environment;
   wherein the processing unit is configured to:
      determine a first field of view of the user of the HMD;
      receive sensor input from the one or more motion sensors;
      detect, using the sensor input, a first movement comprising a downward tilt of the user's head, causing the user to have a second field of view; and
      cause the display to show one or more persistent data elements in the second field of view, based on the detected first movement;
   wherein:
      the one or more persistent data elements comprise a map that appears, from a perspective of the user, in a plane of a physical surface on which the user is located;
      causing the HMD to display the one or more persistent data elements is independent of physical objects viewable in the second field of view, and
      the one or more persistent data elements were not displayed in the first field of view.

10. The apparatus of claim 9, wherein the processing unit is further configured to determine the first field of view is an expected field of view.

11. The apparatus of claim 9, wherein the map includes at least one of:
   a destination,
   a location of the user, or
   a point of interest.

12. The apparatus of claim 11, wherein the map includes the point of interest, the processing unit further configured to cause the display to show, within the first field of view of the user, a data element indicative that the map includes the point of interest.

13. The apparatus of claim 9, wherein the processing unit is further configured to perform functions comprising:
receiving an input from the user, and
causing the map to zoom in or out, based on the received input.

14. The apparatus of claim 9, wherein the processing unit is further configured to perform functions comprising:
detecting a second movement; and
causing the display to move the one or more persistent data elements in a manner corresponding to the second movement.

15. The apparatus of claim 9, wherein the apparatus comprises the HMD.

16. The apparatus of claim 9, wherein the apparatus comprises a device communicatively coupled with the HMD.

17. The apparatus of claim 9, wherein the processing unit is configured to cause the display to show the one or more persistent data elements by causing the display to show one or more icons representative of executable applications.

18. The apparatus of claim 9, wherein the one or more motion sensors comprise at least one of:
an accelerometer,
a gyroscope,
a magnetometer,
a camera,
a Satellite Positioning System (SPS) receiver, or
an altimeter.

19. A non-transitory computer-readable storage medium having instructions embedded thereon for displaying data elements on a see-through head mounted display (HMD), the instructions including computer-executable code for:
determining a first field of view of a user of the HMD;
receiving sensor input from at least one sensor;
detecting, using the sensor input, a first movement comprising a downward tilt of the user's head, causing the user to have a second field of view; and
causing the HMD to display one or more persistent data elements in the second field of view, based on the detected first movement;
wherein:
the one or more persistent data elements comprise a map that appears, from a perspective of the user, in a plane of a physical surface on which the user is located;
causing the HMD to display the one or more persistent data elements is independent of physical objects viewable in the second field of view, and
the one or more persistent data elements were not displayed in the first field of view.

20. An apparatus comprising:
means for determining a first field of view of a user of the HMD;
means for receiving sensor input from at least one sensor;
means for detecting, using the sensor input, a first movement comprising a downward tilt of the user's head, causing the user to have a second field of view; and
means for displaying, via the HMD, one or more persistent data elements in the second field of view, based on the detected first movement;
wherein:
the one or more persistent data elements comprise a map that appears, from a perspective of the user, in a plane of a physical surface on which the user is located;
causing the HMD to display the one or more persistent data elements is independent of physical objects viewable in the second field of view, and
the one or more persistent data elements were not displayed in the first field of view.

21. The apparatus of claim 20, further comprising means for determining the first field of view is an expected field of view.

22. The apparatus of claim 20, wherein the map includes at least one of:
a destination,
a location of the user, or
a point of interest.

23. The apparatus of claim 22, wherein the map includes the point of interest, the apparatus further comprising means for displaying, within the first field of view of the user, a data element indicative that the map includes the point of interest.

24. The apparatus of claim 20, further comprising:
means for receiving an input from the user, and
means for zooming the map in or out, based on the received input.

25. The apparatus of claim 20, further comprising:
means for detecting a second movement; and
means for moving the one or more persistent data elements in a manner corresponding to the second movement.

26. The apparatus of claim 20, wherein the means for displaying the one or more persistent data elements comprises means for displaying one or more icons representative of executable applications.

27. The apparatus of claim 20, wherein the means for receiving sensor input comprise means for receiving input from at least one of:
an accelerometer,
a gyroscope,
a magnetometer,
a camera,
a Satellite Positioning System (SPS) receiver, or
an altimeter.

* * * * *